July 20, 1926. 1,593,003
R. S. ZEITLER
CAR BRAKE
Filed May 29, 1926 2 Sheets-Sheet 1
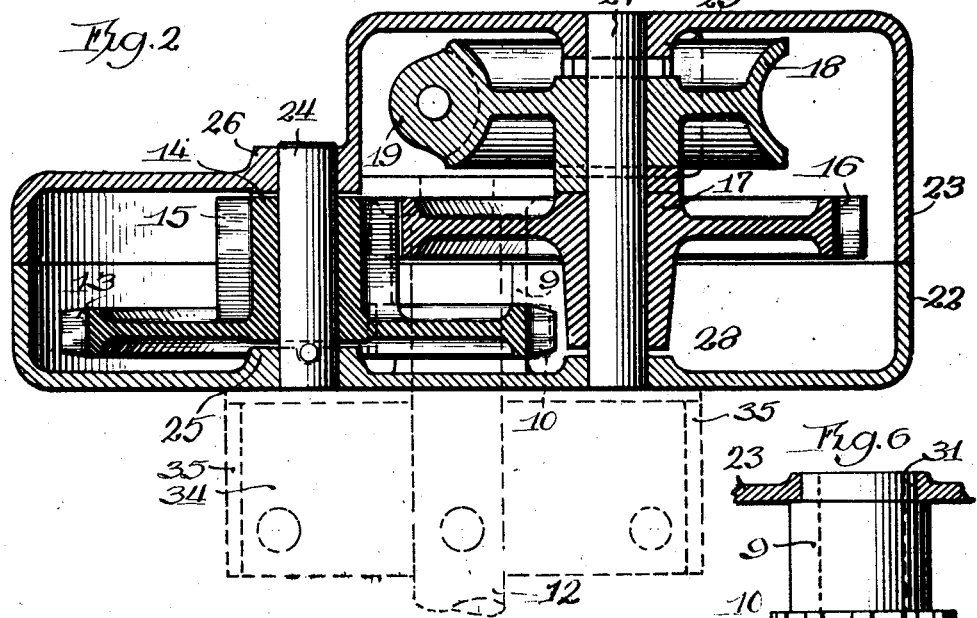
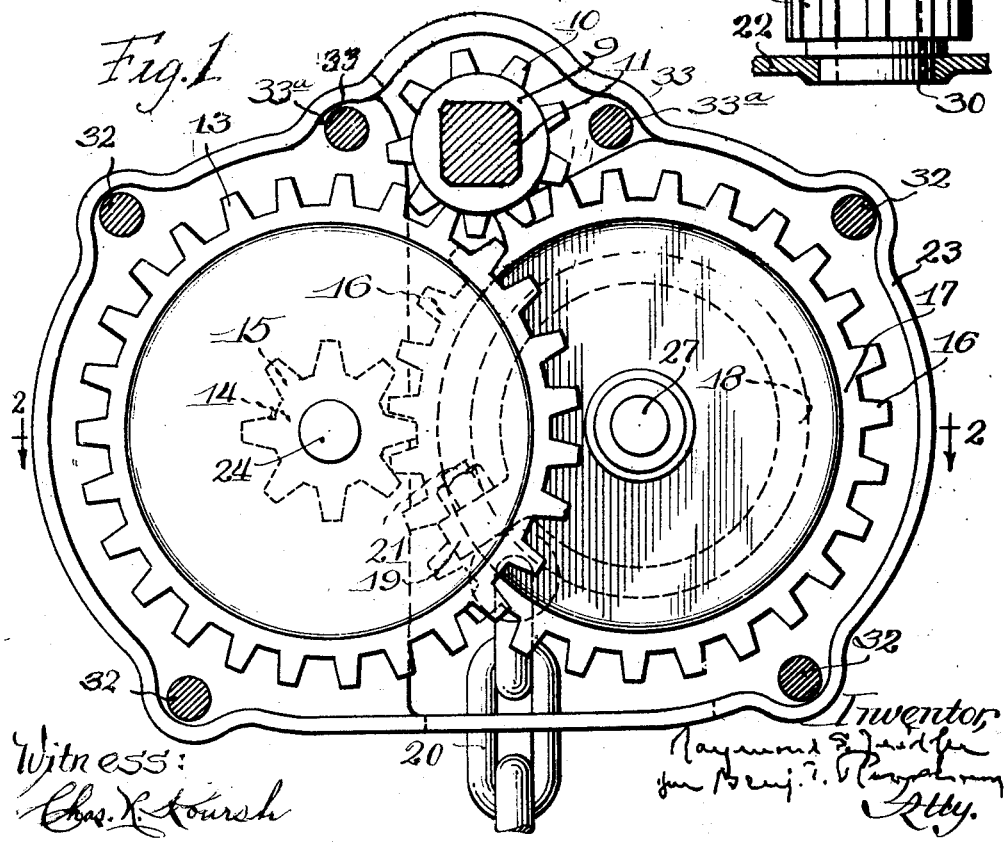

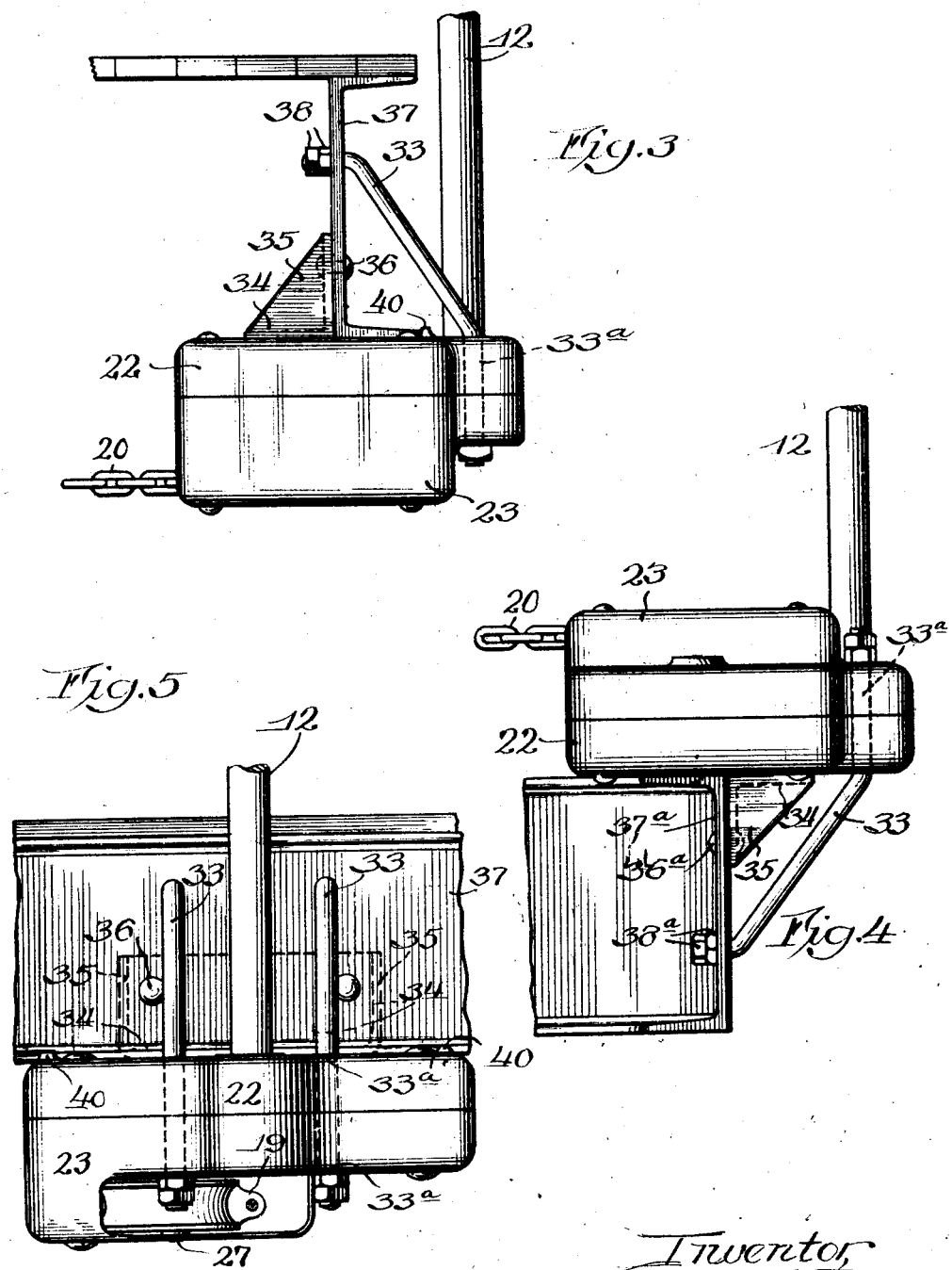

Patented July 20, 1926.

1,593,003

UNITED STATES PATENT OFFICE.

RAYMOND S. ZEITLER, OF CHICAGO, ILLINOIS.

CAR BRAKE.

Application filed May 29, 1926. Serial No. 112,490.

My present invention relates to improvements in car brakes, and has particular reference to the mechanism for operating car brakes manually, either in an emergency or when the train pipe or air pipe is disconnected. By far the most usual form of such apparatus comprises a brake mast or shaft suitably journaled on the end of the car, to the top of which is secured a hand wheel and on the bottom of which is a drum around which the brake chain is wound up and unwound.

In order to secure greater power in the brake chain and brakes divers forms of gear trains have been employed, but when a gear train is employed part of the stress is removed from the brake shaft to the bearings of the gears in the train which develops torsional strains greatly accentuated by the increase of power secured through the gear train so that the designing and mounting of such devices has developed structures of considerable mechanical complication and expense of manufacture. Also car bodies are not always of the same construction which further complicates the problem.

I have had for my objects in designing the present structure the production of a compact gear train suitable for use with car brakes so assembled and encased that it may be mounted either side up as the car construction may require and which is secured against torsional movement by simple torsion or tie rods which are inexpensive, light, easy to install and dependable in operation.

I have attained the foregoing objects by means of the structure illustrated in the accompanying drawing in which—

Fig. 1 is a plan of my improved gear train and housing, one half of the housing being removed to disclose the gears;

Fig. 2 is a section on line 2—2 of Fig. 1;

Fig. 3 is a view of an installation of my apparatus secured pendantly from a cross sill or beam of the car body;

Fig. 4 is a view similar to that shown in Fig. 3 with the mechanism installed upon the top of the cross sill or beam of the car body; and Fig. 5 is a fragmental end view of the car and elevation of the installation shown in Fig. 3.

Fig. 6 is a fragmental sectional detail showing the manner of journaling gear 10.

Similar reference characters have been employed throughout the several views to designate similar parts.

The gear train that I have employed has the advantage of being compact and fairly symmetrical and capable of producing a high ratio of power increase, but it may be possible to design other gear trains having the same advantages.

My present gear train consists of a relatively small drive gear, 10, having a central passageway, 11, preferably of angular conformation so as to permit the similarly angled end of the brake mast, 12, to be introduced therein from either end. The drive gear, 10, meshes with a relatively larger gear, 13, the hub, 14, whereof is extended and provided with a relatively smaller gear, 15. The gear, 15, meshes with a gear, 16, preferably of the same or nearly the same radius as the gear, 13. The hub, 17, of the gear, 16, is extended and provided with a drum or pulley, 18, to a boss, 19, on which the brake chain, 20, is secured by a suitable eye bolt, 21, or in any other desired manner.

These gears are mounted within a preferably pressed steel housing divided horizontally at about its middle portion into vertically disposed portions, 22 and 23.

As shown in Fig. 2, the hub, 14, of the gears, 13 and 15, rotates upon a pin, 24, the ends of which are mounted respectively in bosses, 25 and 26, located in the housing members, 22 and 23, and the hub, 17, of the gear, 16, likewise rotates upon a pin, 27, the ends of which likewise are mounted in bosses, 28 and 29, also provided in housing members, 22 and 23.

The hub, 9, of the gear, 10, however, is extended and the ends thereof reduced to journal in apertures, 30 and 31, provided in the respective housing members, 22 and 23, as shown in Fig. 6. The two members of the gear casing are secured together by rivets or bolts, 32, located at substantially the four corners of the housing and passing through the upper and lower or horizontal walls thereof.

The two members of the housing are also perforated at 33ᴬ in a similar manner as for the rivets or bolts, 32, preferably upon each side of the gear, 10, for the tie or torsion rods, 33.

About the center of the housing and exteriorly of either the member, 22 or 23, according to the design of structure with which the device is to be assembled, is secured by welding or in any other suitable manner, an L section bracket, 34. This bracket is preferably reinforced with webs, 35, the relation of which to the L shaped bracket are plainly shown in Fig. 2.

An installation suitable for either gondola or box cars is shown in Figs. 3 and 5, in which the upstanding flange of the bracket, 34, is bolted or riveted by means of bolts or rivets, 36, to the rear face of the transverse beam, 37, of the car body. The tie rods, 33, are then passed upwardly through the perforations, 33ᴬ, and inclined to and passed through perforations provided in the upper portion of the transverse sill or beam, 37, and secured thereto by a nut or nuts, 38. In this form of installation I also prefer to provide a stop, 40, on the exterior of the housing member, which abuts an edge of a flange of the beam or sill, 37.

In Fig. 4, I have illustrated an installation particularly suitable for hopper cars. In this installation the gear housing with its contained elements has been inverted. The bracket, 34, has also been faced in the opposite direction and the gear housing rests upon the top of the cross sill or beam, 37ᴬ, to the forward face of which the outstanding flange of the bracket is bolted or riveted by the rivet, 36ᴬ. In this form of installation, the tie or torsion rods are passed downwardly through the apertures, 33ᴬ, and inclined downwardly to the lower portion of the web of the sill or the beam, 37ᴬ, through which they pass and to which they are secured by the nut or nuts, 38ᴬ.

It will be seen from the foregoing description, taken in connection with the drawings, that I have provided a simple and effective car brake operating mechanism which is capable of being mounted in connection with divers car constructions by merely the change in the position of a single supporting bracket. These brackets may be attached after the orders specifying the proper locations for the brackets have been received, or different assemblies of brackets with the housing members may be kept in stock and the assembly of the housing with the gears made upon receipt of the order, as the relations of gear train and housing are the same in all installations.

It is particularly pointed out that the employment of tie or torsion rods running from the forward end of the casing in combination with the transversely disposed supporting brackets meet all twisting or torsional strains much more simply and with much less weight of metal than could be attained by any possible bracing of the opposite end of the gear housing, even if the same were built solidly into the body of the car.

Having described my invention what I claim as new and desire to secure by Letters Patent is—

1. In car brakes, a gear train, a housing divided into upper and lower members between which members said gears are journaled, a bracket disposed transversely of and extending from one of said housing members and torsion rods passing from said housing adjacent the edge opposite said bracket and inclined for engagement with the car element to which said bracket is secured.

2. In car brakes, a gear train, a housing divided into upper and lower members between which members said gears are journaled, a bracket disposed transversely of and extending from one of said housing members and torsion rods passing through said housing adjacent the edge opposite said bracket and inclined for engagement with the car element to which said bracket is secured.

RAYMOND S. ZEITLER.